US010766339B2

United States Patent
Caliskan et al.

(10) Patent No.: US 10,766,339 B2
(45) Date of Patent: Sep. 8, 2020

(54) VEHICLE STRUCTURAL AIR DUCT

(71) Applicant: Ford Global Technologies, LLC, Dearborn, MI (US)

(72) Inventors: Ari Garo Caliskan, Canton, MI (US); Nicolas Zagorski, Rochester, MI (US); Andrew J. Stankovich, Brighton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 705 days.

(21) Appl. No.: 15/416,860

(22) Filed: Jan. 26, 2017

(65) Prior Publication Data

US 2018/0208022 A1   Jul. 26, 2018

(51) Int. Cl.
*B60H 1/24*   (2006.01)
*B62D 25/06*   (2006.01)
*B60H 1/00*   (2006.01)

(52) U.S. Cl.
CPC ......... *B60H 1/245* (2013.01); *B60H 1/00564* (2013.01); *B60H 1/247* (2013.01); *B62D 25/06* (2013.01); *B60H 2001/00235* (2013.01); *B60Y 2306/05* (2013.01); *B60Y 2306/07* (2013.01)

(58) Field of Classification Search
USPC ........................................................ 454/137
See application file for complete search history.

(56) References Cited

U.S. PATENT DOCUMENTS

| | | | | |
|---|---|---|---|---|
| 3,835,757 A | * | 9/1974 | Shakespear | B60H 1/265 454/148 |
| 4,252,053 A | * | 2/1981 | Muto | B60H 1/247 454/137 |
| 4,432,213 A | | 2/1984 | Katahira et al. | |
| 4,444,705 A | * | 4/1984 | Kumasaka | B62D 25/06 264/46.5 |
| 4,640,184 A | | 2/1987 | Matsushima et al. | |
| 5,226,696 A | * | 7/1993 | Klages | B62D 23/005 296/203.01 |
| 5,399,121 A | * | 3/1995 | Gray | B60H 1/245 454/137 |
| 6,062,635 A | | 5/2000 | Learman et al. | |
| 6,086,145 A | | 7/2000 | Wandyez | |
| 6,120,091 A | | 9/2000 | Reich et al. | |
| 6,186,886 B1 | * | 2/2001 | Farrington | B60H 1/243 454/124 |

(Continued)

FOREIGN PATENT DOCUMENTS

| | | | | |
|---|---|---|---|---|
| EP | 0057886 A1 | * | 8/1982 | ......... B60R 13/0225 |
| FR | 3055586 A1 | * | 3/2018 | ............. B60H 1/245 |

(Continued)

Primary Examiner — Edelmira Bosques
Assistant Examiner — Frances F. Hamilton
(74) Attorney, Agent, or Firm — David Coppiellie; Brooks Kushman P.C.

(57) ABSTRACT

A vehicle body structure includes spaced roof rails and a structural air duct. The air duct has at least two bows connecting between the roof rails and defining first and second channels. An interconnecting member is connected between the bows and defines a third channel connecting the first and second channels in fluid communication with each other. At least one of the bows defines an outlet port configured to supply air to a cabin.

21 Claims, 4 Drawing Sheets

(56) References Cited

U.S. PATENT DOCUMENTS

| | | | |
|---|---|---|---|
| 6,315,354 B1 * | 11/2001 | Tani | B60H 1/00207 296/208 |
| 6,318,102 B1 * | 11/2001 | Asou | B60H 1/00207 454/137 |
| 6,457,767 B1 * | 10/2002 | Omarain | B60H 1/247 296/208 |
| 6,543,841 B1 | 4/2003 | Ohkubo | |
| 6,685,262 B1 | 2/2004 | Tiesler et al. | |
| 6,887,552 B2 | 5/2005 | Dykman et al. | |
| 6,899,381 B1 | 5/2005 | Fero et al. | |
| 6,932,693 B2 * | 8/2005 | Nakagawa | B60H 1/00564 454/137 |
| 7,165,806 B2 * | 1/2007 | Osterberg | B62D 25/06 296/203.03 |
| 7,237,834 B2 | 7/2007 | Czinki et al. | |
| 7,334,834 B2 | 2/2008 | Hill et al. | |
| 8,042,863 B2 * | 10/2011 | Nydam | B62D 33/08 296/104 |
| 8,128,161 B2 * | 3/2012 | Yang | B60H 1/00564 296/208 |
| 8,641,134 B2 | 2/2014 | Sawyer et al. | |
| 9,855,972 B2 * | 1/2018 | Hamdoon | B62D 21/157 |
| 10,137,761 B2 * | 11/2018 | Caliskan | B60H 1/245 |
| 2002/0117874 A1 * | 8/2002 | Taylor | B62D 25/06 296/178 |
| 2002/0195844 A1 | 12/2002 | Hipwell | |
| 2003/0096129 A1 | 5/2003 | Kojima | |
| 2006/0199491 A1 * | 9/2006 | Droulez | B60H 1/0055 454/69 |
| 2007/0044492 A1 | 3/2007 | Ichikawa et al. | |
| 2007/0102958 A1 * | 5/2007 | Fillion | B62D 65/04 296/178 |
| 2007/0123157 A1 * | 5/2007 | Shah | B60H 1/244 454/121 |
| 2009/0217608 A1 * | 9/2009 | Braun | B60H 1/00564 52/302.1 |
| 2011/0074184 A1 * | 3/2011 | Hashikawa | B60H 1/00564 296/208 |
| 2011/0121614 A1 | 3/2011 | Kobayashi et al. | |
| 2011/0127803 A1 | 6/2011 | Ludwig et al. | |
| 2013/0207420 A1 * | 8/2013 | Kumar | B62D 25/06 296/217 |
| 2014/0213165 A1 * | 7/2014 | Goenka | B60H 1/242 454/127 |
| 2014/0335295 A1 | 11/2014 | Onodera | |
| 2015/0246592 A1 * | 9/2015 | Fisher | B60H 1/00414 454/143 |
| 2016/0221611 A1 * | 8/2016 | Wolf | B62D 25/04 |
| 2017/0137067 A1 * | 5/2017 | Wolf | B62D 25/02 |

FOREIGN PATENT DOCUMENTS

| | | | |
|---|---|---|---|
| GB | 539738 A * | 9/1941 | B60H 1/247 |
| GB | 1171258 A * | 11/1969 | B62D 25/06 |

\* cited by examiner

VEHICLE STRUCTURAL AIR DUCT

TECHNICAL FIELD

The present disclosure relates to a heating, ventilation, and air conditioning (HVAC) system having a structural air duct integrated into a roof structure of a vehicle.

BACKGROUND

Automotive vehicles include HVAC systems for heating and cooling the passenger cabin of the vehicle. Larger sport-utility vehicles (SUV) typically include an overhead air duct disposed above the second and third rows of seats. The air ducts are not part of the roof structure and are typically located under the cross members of the roof structure and above the headliner. The air ducts include outlet ports that supply air into the passenger cabin.

SUMMARY

According to one embodiment, a vehicle body structure includes spaced roof rails and a structural air duct. The air duct has at least two bows connecting between the roof rails and defining first and second channels. An interconnecting member is connected between the bows and defines a third channel connecting the first and second channels in fluid communication with each other. At least one of the bows defines an outlet port configured to supply air to a cabin.

According to another embodiment, a vehicle includes roof rails, a rear header extending between the rails, and a structural air duct located forward of the rear header. The air duct has a structural body defining an open channel and having first and second portions each connected to one of the rails. A component is sealed to flanges of the body and covers over the body to define a plenum.

According to yet another embodiment, a vehicle includes roof rails and a structural air duct having a structural body with at least four mounting portions each attached to one of the roof rails. An outlet port is defined in a bottom of the body. An air shutter is disposed in the outlet port. A component is sealed to a top of the body such that the body and the component cooperate to define a plenum.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
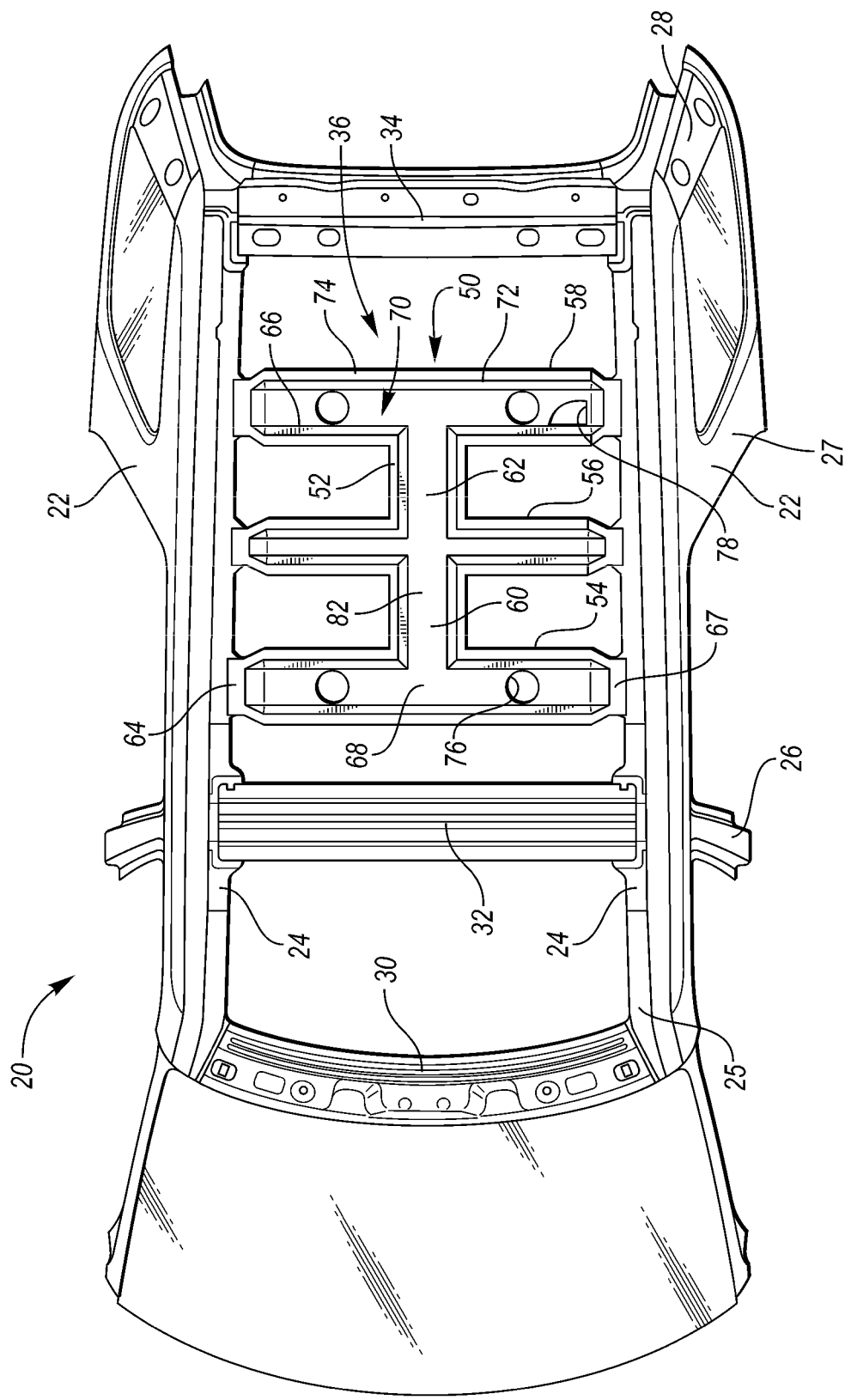
FIG. 1 is a partial top view of a vehicle including a structural air duct according to one or more embodiments.
Figure 2:
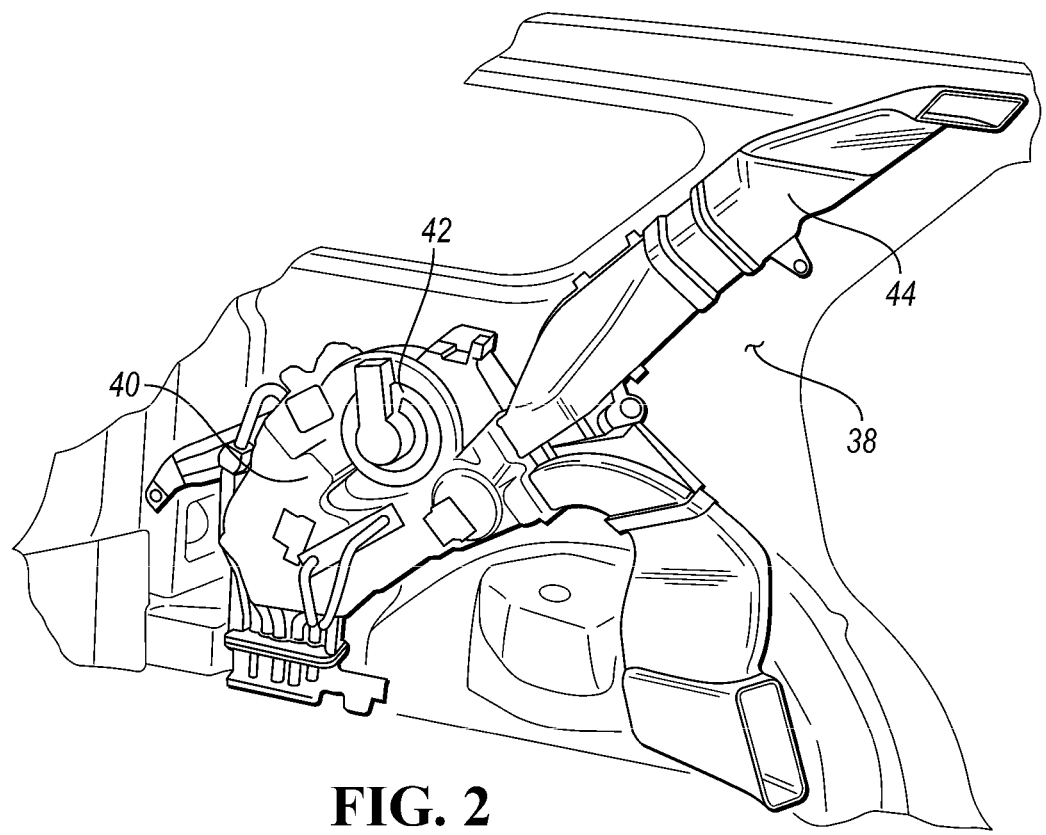
FIG. 2 is a partial perspective view of rear portion of the vehicle with trim components omitted to show an auxiliary HVAC system.

Referring to FIGS. 1 and 2, a vehicle 20, such as an SUV, has a pair of longitudinal body sides 22 formed on opposing sides of the vehicle. A pair of spaced apart roof rails 24 extend longitudinally along the vehicle and are located at an upper portion of the body sides 22. The body structure includes pillars such as A-pillars 25, B-pillars 26, C-pillars 27, and D-pillars 28 that extend downwardly from the roof rails 24 and terminate at a side sill (not shown). The body structure may include a plurality of cross members, such as a windshield header 30, a roof bow 32, and a rear header 34 that each extend between the roof rails 24. The body structure defines a passenger cabin 36 configured to house occupants of the vehicle 20.

The vehicle 20 includes an HVAC system for heating and cooling the passenger cabin 36. Many three-row SUVs include vents in the dashboard as well as overhead vents above the second and third rows of seats. The dashboard vents may be part of a main HVAC system and the overhead vents may be part of an auxiliary HVAC system. Each of the HVAC systems may include a dedicated HVAC housing and blower motor and may be capable of operating independently of each other.

The vehicle 20 includes an auxiliary HVAC housing 40 connected to a body panel 38 near the rear wheel well. The housing 40 may be hidden behind the trim components of the passenger cabin 36. A blower 42 is disposed within the housing 40 and powers the auxiliary HVAC system. A supply duct 44 supplies air to a structural air duct 50 that is disposed overhead of the passenger cabin 36. The air duct 50 is arranged to blow air at the second and third rows of seats.

Typically, vehicles include structural cross member, e.g., roof bows extending between the roof rails and a separate air-duct assembly supported under the cross members. By making the air duct 50 structural, the cross members and the air duct can be integrated into a single, multipurpose component that replaces the multiple separate components. This integration can increase headroom, reduce the number of parts, reduce costs, and improve manufacturing efficiencies. The term "structural," as used herein, means that the particular component or components are load bearing or otherwise provide support for the vehicle body. By making the air duct structural, the number of roof bows may be reduced.

Figure 3:
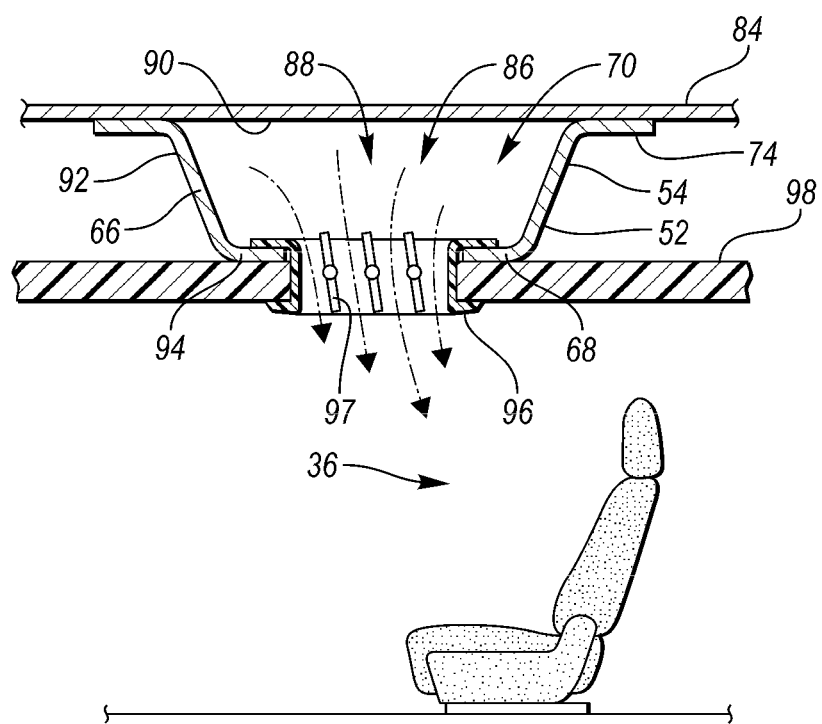
FIG. 3 is a diagrammatical elevation view of the vehicle illustrating a cross section of the structural air duct of FIG. 1 and a portion of a passenger cabin.

Referring to FIGS. 1 and 3, the structural air duct 50 has a structural body 52 extending between the roof rails 24 and located between the rear header 34 and the roof bow 32 to be positioned above the second and third rows of seats. In one or more embodiments, the body 52 includes a first bow 54, a second bow 56, and a third bow 58 each extending between the roof rails 24. The first bow 54 may include a first mounting portion 64 attached to the passenger-side roof rail and a second mounting portion 67 attached to the driver-side roof rail. The second bow 56 and the third bow 58 may have similar mounting portions attached to the roof rails 24. The structural body 52 may be made of metal alloy, such as steel or aluminum, plastic, composite, or other suitable material. The air duct 50 may be attached to the roof rails 24 by welding, fasteners, adhesive, or any other joining technique known in the art.

Each bow may have an open top, opposing sidewalls 66, and a bottom wall 68 that cooperate to define an open channel 70. The bows may have a U-shaped, C-shaped, or tubular cross-section. A flange 74 may extend outwardly from a top 72 of each of the sidewalls. The flanges 74 allow the structural body 52 to be connected to a component such as a roof panel or a cap as will be described in more detail below. The bows 54, 56, and 58 are structural members that provide lateral support between the roof rails 24 to reduce lateral deflection of the vehicle sides 22. The bows of the air duct 50 replace traditional cross members that are typically located in that area of the vehicle.

The first bow 54 may be interconnected with the second bow 56 by a front interconnecting member 60, and the second bow 56 may be interconnected with the third bow 58 by a rear interconnecting member 62. The interconnecting members 60, 62 may have a U-shaped, C-shaped, or tubular cross-section. The interconnecting members may have the same cross section as the bows. The interconnecting members 60, 62 also define open channels 82 that allow air to flow between the first, second, and third bows. In addition to connecting the bows in fluid communication, the interconnecting members may also add strength to the roof structure.

A roof panel 84 may be attached to the flanges 74 to cover the open top of the structural body 52. Mastic, or other adhesive or sealing compound may be applied continuously along the flanges 74 to form an airtight seal between the roof panel 84 and the structural body 52. The roof panel 84 and the structural body 52 cooperate to define a plenum 86 of the structural air duct 50. The structural body 52 defines the sides 92 and bottom 94 of the plenum 86 and a bottom surface of the roof panel 84 defines a top 90 of the plenum 86.

An inlet port 78 is defined in the structural body 52 and is connected to the supply duct 44 to connect the plenum 86 in fluid communication with the HVAC housing 40. In the illustrated embodiment, the inlet port 78 is defined in the bottom wall 68 of the third bow 58, but may be located in other locations in other embodiments. The structural body 52 defines at least one outlet port 76 allowing air to flow from the plenum 86 and into the passenger cabin 36. In one or more embodiments, a pair of outlet ports are defined in the bottom wall 68 of the first bow 54, and a pair of outlet ports are defined in the bottom wall 68 of the third bow 58. The specific placement of the outlet ports may vary depending upon the layout of the passenger cabin 36.

An air shutter 96 is disposed in each of the outlet ports 76. The air shutter 96 may include a tubular portion received in the outlet port 76 and extending downwardly through a hole in the headliner 98. A bezel may be formed around a perimeter of the tubular body to hide the hole in the headliner 98. The air shutter 96 may include a plurality of blades 97 allowing a user to aim the air stream in a desired direction and to close the air shutter 96.

The open channels 70, 82 of the roof bows and the interconnecting members, respectively, may form individual passageways 88 of the plenum 86. In the illustrated embodiment, all of the channels are interconnected in fluid communication with each other and all form passageways of the plenum despite outlet ports not being located on the second bow 56. In other embodiments, channels not servicing outlet ports may be separated from the plenum by a blocking member or a wall. For example, the channel of bow 56 may be separated from the plenum 86 since the channel does not service an outlet port. An example of this is shown in FIG. 6 and will be described in more detail below.

Figure 4:
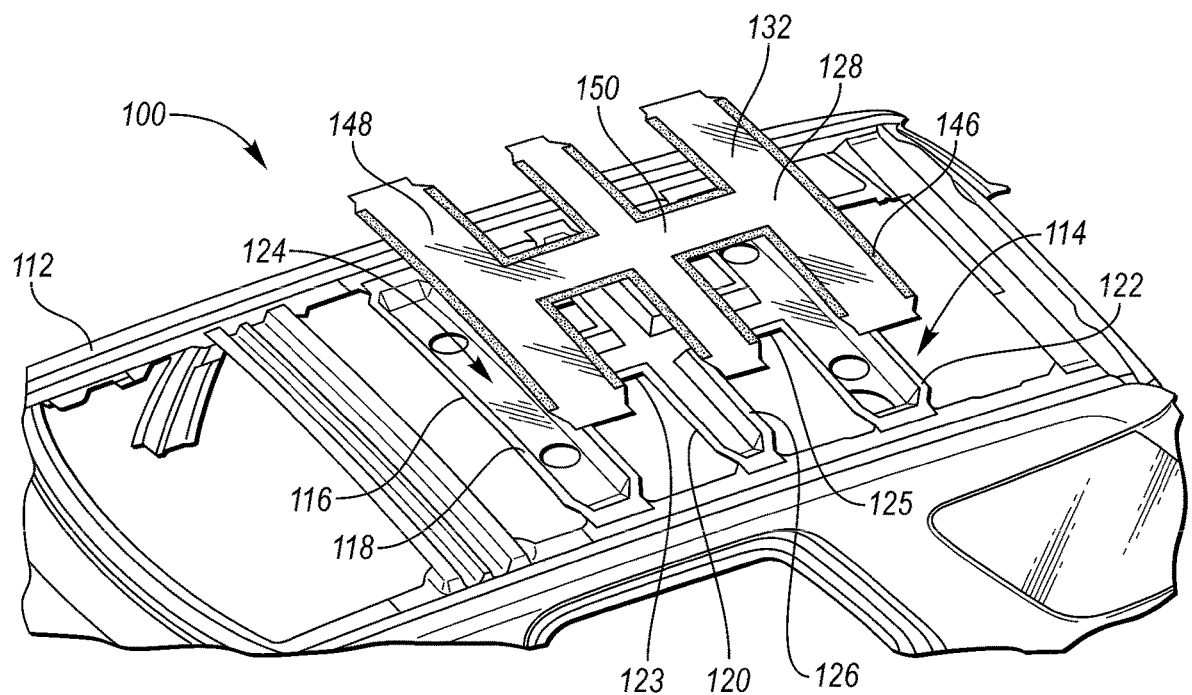
FIG. 4 is a partial exploded perspective view of a roof of a vehicle including a structural air duct having a cap.
Figure 5:
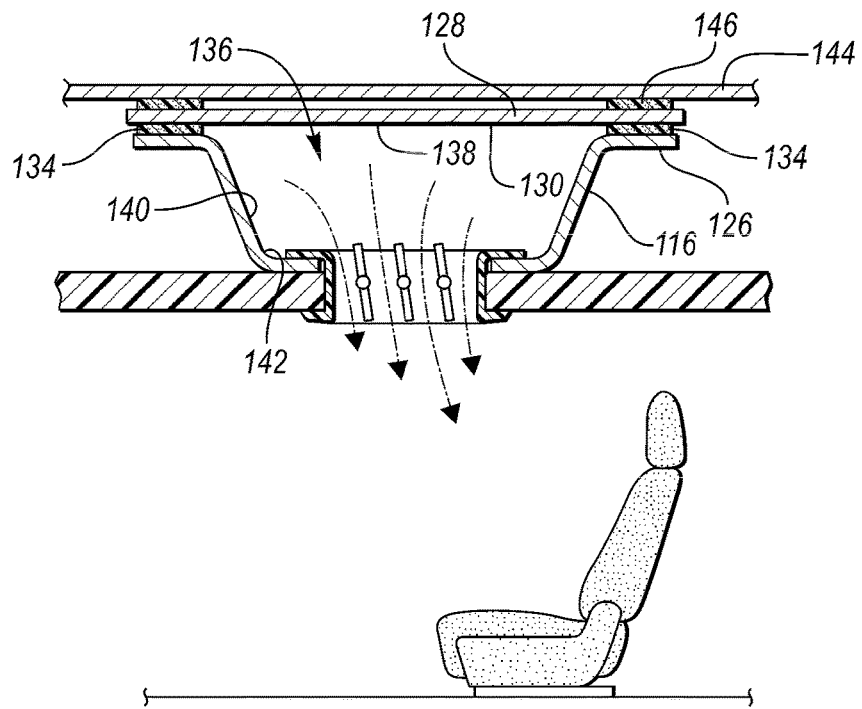
FIG. 5 is a diagrammatical elevation view of the vehicle of FIG. 4 illustrating a cross section of the structural air duct and a portion of a passenger cabin.

Referring to FIGS. 4 and 5, a vehicle 100 has a pair of spaced apart roof rails 112 and a structural air duct 114 connected between the roof rails 112. The structural air duct 114 includes a structural body 116 having a first bow 118, a second bow 120, a third bow 122, and interconnecting members 123 and 125 similar or identical to body 52. The bows and the interconnecting members may define open channels 124. The bows and interconnecting members may also include flanges 126 for connecting the top of the structural body 116 to a cap 128. The cap 128 has a bottom side 130 sealed to the flanges 126 by mastic 134 or other sealing compound. The cap 128 cooperates with the structural body 116 to define a plenum 136 configured to distribute air to the passenger cabin. The cap 128 defines a top 138 of the plenum and the structural body 116 defines the sides 140 and the bottom 142 of the plenum. The cap 128 may be shaped to conform with the shape of the structural body 116. For example, the cap 128 may include three transverse sections 148 disposed over the bows 118, 120, 122 and a pair of longitudinal sections 150 disposed over the interconnecting members 123, 125. The cap 128 may be a structural component or a nonstructural component, and may be formed of any suitable material such as metal alloy, plastic, or composite. A roof panel 144 extends between the roof rails 112 and is disposed over the cap 128. Mastic 146, or other sealing compound, joins a top side 132 of the cap 128 to a bottom side of the roof panel 144.

Figure 6:
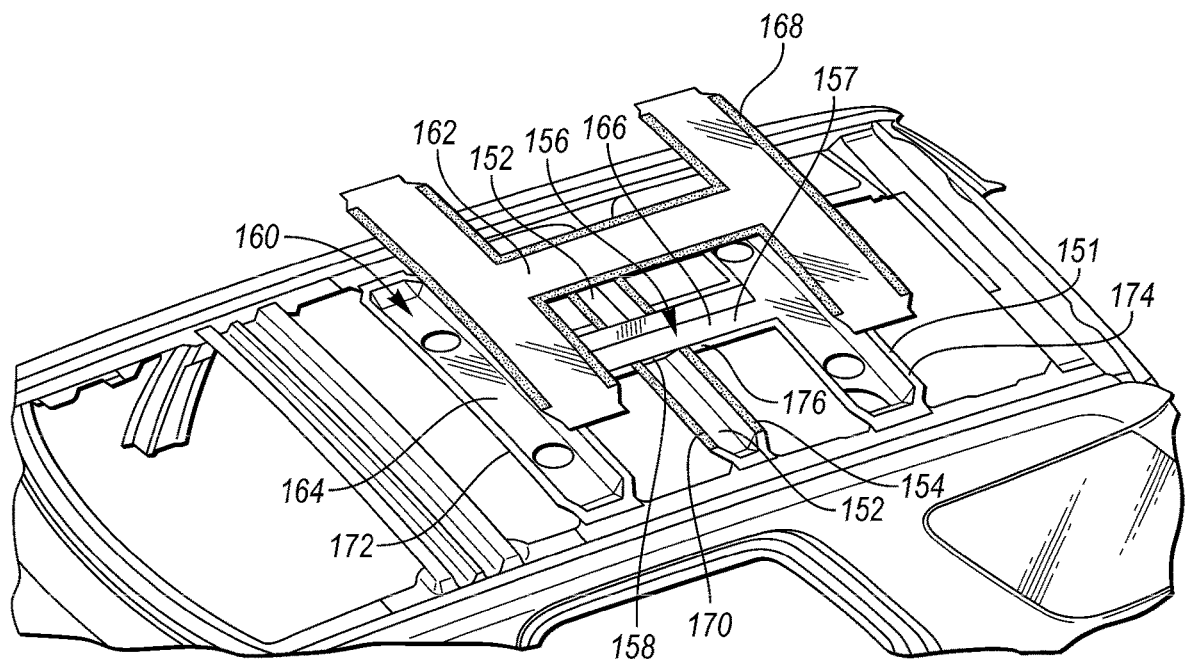
FIG. 6 is a partial exploded perspective view of a roof of a vehicle having a structural air duct according to another embodiment.

FIG. 6 illustrates structural air duct 151, which is a modified version of the air duct 114. Here, channels 152 of a second bow 154 are not part of a plenum 160 of air duct 151. The channels 152 are separated from channel 156 of an interconnecting member 157 by a separator 158. The separator 158 may be a wall of the interconnecting member or may be a separate blocking element, e.g., a plate, attached to interconnecting member 157. The channels 152 are separated from the plenum 160 because they do not service outlet ports.

The cap 162 is shaped to only cover channels that form passageways of the plenum 160. Thus, the plenum 160 includes a pair of transverse passageways 164 defined by a front bow 172 and a rear bow 174, and a longitudinal passageway 166 defined by the interconnecting member 157. Mastic 168 may be applied to the cap 162 to connect the cap 162 to a roof panel. Mastic 170 may be applied to flanges of the second bow 154 to connect the second bow 154 directly to the roof panel.

Figure 7:
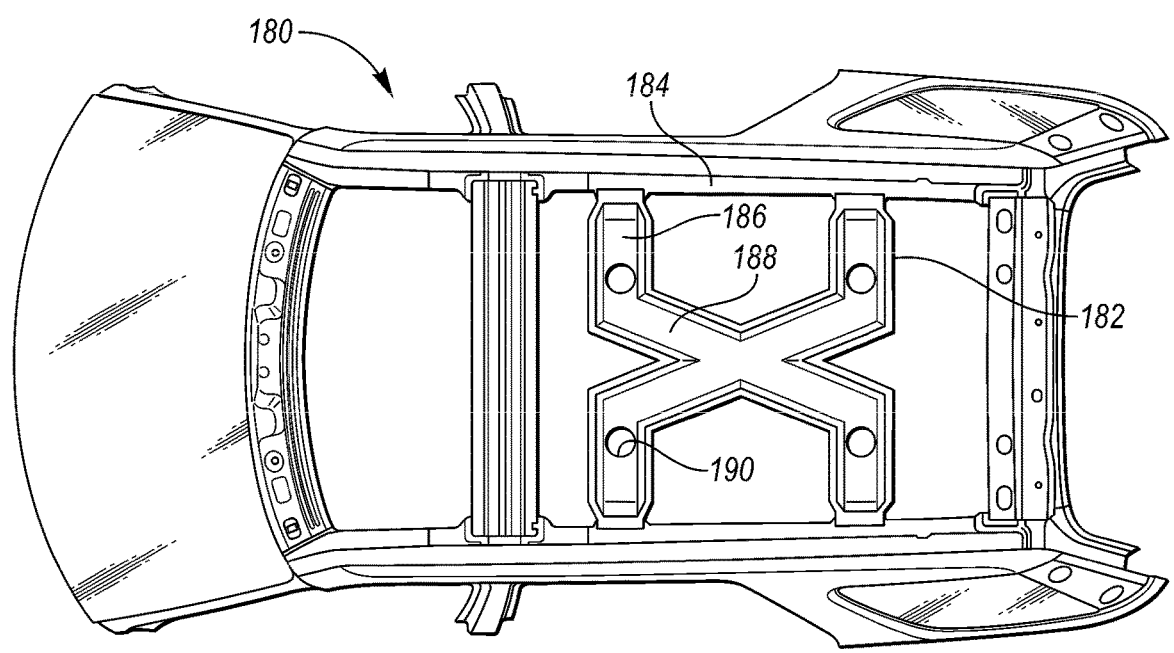
FIG. 7 is a partial top view of a vehicle having a structural air duct according to yet another embodiment.

Referring to FIG. 7, the shape and configuration of the structural air duct may vary according to packaging constraints, structural constraints, and cabin layout. Vehicle 180 has an X-shaped structural air duct 182 that connects between a pair of spaced apart roof rails 184. The air duct 182 may include transverse sections 186 each connected to one of the roof rails 184 and angled sections 188 that connect between the transverse sections 186. The angled sections 188 connect with each other at a central portion to connect each of the sections in fluid communication with each other. Outlet ports 190 may be defined in bottom walls of the transverse sections 186. The air duct 182 may be connected to a roof panel to seal the air duct or may include a cap that seals the air duct as described above in the previous embodiments.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle body structure comprising:
   spaced apart roof rails;
   a structural air duct including
      at least two bows connecting between the roof rails and defining first and second channels,
      an interconnecting member connected between the bows and defining a third channel connecting the first and second channels in fluid communication with each other, wherein at least one of the bows defines an outlet port configured to supply air to a cabin, and
      a cap attached to the bows and the interconnecting member to define a plenum; and
   a roof connected between the roof rails and extending over the cap.

2. The vehicle body structure of claim 1, wherein at least one of the bows defines an inlet port in fluid communication with a blower.

3. The vehicle body structure of claim 1, wherein each of the first, second and third channels has a U-shaped cross section.

4. A vehicle comprising:
   roof rails;
   a rear header extending between the rails;
   a structural air duct located forward of the rear header and including a structural body defining an open channel and having first and second portions each connected to one of the rails, wherein the structural body has flanges;
   a cap sealed to the flanges and covering over the body to define a plenum; and
   a roof panel attached to a top surface of the cap.

5. The vehicle of claim 4, wherein the structural body includes a bottom portion and a pair of side portions that define the open channel, wherein the flanges extend outwardly from the side portions.

6. The vehicle of claim 5, wherein the bottom portion defines an outlet port.

7. The vehicle of claim 6 further comprising an air shutter disposed within the outlet port.

8. The vehicle of claim 4, wherein the open-channel section has a U-shaped cross section.

9. The vehicle of claim 4, wherein the first portion is formed on a first segment of the body and the second portion is formed on a second segment of body that is located rearward of the first segment.

10. The vehicle of claim 4, wherein the cap is sealed to the flanges by a first adhesive and the cap is sealed to the roof panel by a second adhesive.

11. The vehicle of claim 4 further comprising:
   a heating, ventilation, and air conditioning system including a blower connected in fluid communication with the structural air duct.

12. A vehicle comprising:
   roof rails;
   a structural air duct including a structural body having at least four mounting portions each attached to one of the roof rails, and an outlet port defined in a bottom of the body;
   an air shutter disposed in the outlet port;
   a cap sealed to a top of the body such that the body and the cap cooperate to define a plenum; and
   a roof panel attached to a top surface of the cap.

13. The vehicle of claim 12, wherein the body further includes a plurality of open-channel sections interconnected with each other.

14. The vehicle of claim 12 further comprising:
   a heating, ventilation, and air conditioning system including a blower connected in fluid communication with the structural air duct.

15. The vehicle of claim 12, wherein the structural body further has at least two bows connecting between the roof rails and defining first and second channels and has an interconnecting member connected between the bows and defining a third channel connecting the first and second channels in fluid communication with each other.

16. The vehicle of claim 15, wherein each of the first, second and third channels has a U-shaped cross section.

17. The vehicle of claim 15, wherein the outlet port is defined in one of the bows.

18. The vehicle of claim 12, wherein the structural body further has a bottom portion, a pair of side portions cooperating with the bottom portion to define an open channel, and flanges extend outwardly from the side portions.

19. The vehicle of claim 18, wherein the flanges are joined to the cap.

20. The vehicle of claim 12, wherein the cap is joined to the structural body by a first adhesive and the cap is joined to the roof panel by a second adhesive.

21. The vehicle of claim 12, wherein the structural air duct is X-shaped and includes transverse sections having the mounting portions and a pair of angled sections that connect between the transverse sections, wherein the angled sections intersect at a central portion to place the angled sections in fluid communication.

* * * * *